United States Patent Office 3,251,674
Patented May 17, 1966

3,251,674
HERBICIDAL COMPOSITION AND METHOD
George S. Kido, Oakland, Calif., assignor to The O. M. Scott and Sons Co., Marysville, Ohio, a corporation of Ohio
No Drawing. Filed Dec. 28, 1962, Ser. No. 247,849
5 Claims. (Cl. 71—2.6)

This invention relates to a method of, and composition for, control of weeds in Dichondra and certain other turf grasses, and more particularly is based on the discovery that neburon may be utilized as the primary active ingredient in a method of selective weed control in such turf vegetation.

In accordance with the present invention "neburon," the common name for the compound 3-(3,4-dichlorophenyl)-1-methyl-1-n-butyl urea, has been found to be valuable as a selective weed control material in Dichondra, Bermuda and bluegrass lawns, particularly the former. Dichondra is a shallow rooted low-growing herb that has become one of the preferred ground covers for lawns in Southern California. California Agricultural Extension Service Leaflet 125 embodies a complete description of Dichondra.

The trisubstituted ureas are disclosed in U.S. Patents 2,655,444, 2,655,445, 2,665,446 and 2,665,447 as being capable of killing weed seedlings which germinate near the surface of the soil before the weeds have had time to develop a deep root system. Neburon is disclosed in U.S. Patent 2,655,444.

The prior art most pertinent to this invention is therefore U.S. Patent 2,655,444, and U.S. Patent 2,898,206, which discloses the use of another trisubstituted urea herbicide, monuron, for selective weed control in Dichondra. However, monuron has been found to be deleterious to surrounding trees and ornamentals, and, in comparison to neburon, Dichondra is less tolerant of monuron. A greater chance of damaging the desirable Dichondra therefore exists with monuron due to overapplication and variations in application.

The primary advantages of the present invention are that neburon is a very effective herbicide and weed control, but is also highly compatible with Dichondra, Bermuda or bluegrass, resists leaching through the soil and therefore will not be readily placed in contact with surrounding trees and ornamentals, has a higher margin of safety than prior Dichondra herbicides, and has shown good control of Poa annua, a very difficult weed to control.

These and other advantages are achieved by use of the present invention of neburon in amounts ranging generally from 2 to 24 lbs. per acre of treated turf, although other rates may be employed where warranted by special circumstances. The neburon is preferably applied in combination with a carrier, and in accordance with this invention, is particularly effective when compounded with a urea-formaldehyde condensation product fertilizer carrier, as will be fully described below. Such compositions effect a kill of the undesirable weeds by the selectively active neburon while at the same time the unharmed desirable plants are fed, thereby resulting in improved growth and greater resistance to the damaging influences of the present undesirables.

Accordingly, it is a primary object of this invention to provide a method of, and compositions for, selectively controlling weeds in Dichondra lawns with neburon.

Further objects are to selectively control weeds in bluegrass and Bermuda grass lawns with neburon, and to control weeds in lawns with neburon while simultaneously building the resistance of the desirable lawn plants to the deleterious effects of the weeds, as by fertilizing the lawn plants.

Other objects and advantages of the present invention will become apparent to those skilled in this art from the following description of the best mode of carrying out this invention and exemplifications and modifications thereof, and from the appended claims.

In general, neburon may be applied to a lawn in any convenient form. For example, it may be dissolved or emulsified in a solvent and sprayed on the area. It may be combined with a diluent and other adjuvants to make a dust and applied with conventional dusting equipment. It may also be formulated with a granular carrier and applied with conventional granular spreaders. Unless otherwise specified, as used hereafter, the term "carrier" is intended to refer to any suitable carrier medium such as organic solvents, fertilizer materials, water, vermiculite, perlite, diatomaceous earth, clays and like materials. The addition in such spray, dust or granular formulations or diluents, stabilizers, surfactants, plant nutrients, flow enhancing agents, adhesives, dyes or other adjuvants is also contemplated, to obtain their known advantages, and cooperation with neburon, and especially to give formulations which may be safely handled and are convenient to apply accurately to the area to be treated.

Neburon as applied in spray, dust or granular form may be present in the formulation in amounts of the order of from 0.02% to 95% by weight. The neburon is of course applied in an amount sufficient to assure herbicidal action. Generally from 2 to 24 lbs./acre neburon may be used while good control is obtained with 4–8 lbs./acre neburon. In order to get season long weed control, repeat treatments may be required.

It has been found that incorporation of neburon with a plant food is a particularly effective means of distributing the herbicide, and further stimulates lawn growth and enhances the ability of the desirable plants to compete with the dying weeds, thereby contributing to weed control. Fertilization also promotes the spreading of the desirable plants into the areas previously covered by weeds thus contributing to the complete coverage of the soil with desirable Dichondra, Bermuda grass or bluegrass.

A preferred means of formulating such a composition is by the sticking of the herbicidal ingredient neburon to a granular fertilizer carrier using a sticking agent. The fertilizer may be made substantially as disclosed in copending application Serial No. 693,629, now Patent No. 3,076,700. Briefly, this involves forming a granular fertilizer condensation product by dispersing a methylol ureas solution on vermiculite or other suitable carrier materials, and promoting condensation of the methylol ureas to form partially insoluble methylene ureas. The fertilizer preferably has at least ⅓ of the total nitrogen in water insoluble form with an availability index of at least 35%. Details of the production of a suitable urea-formaldehyde fertilizer material are fully set out in copending application Serial No. 693,629, now Patent No. 3,076,700, and reference to said application is hereby made as if fully set out herein.

Neburon may then be added in a blender and bonded to the fertilizer carrier using a sticking agent as disclosed in copending application Serial No. 60,287, now Patent No. 3,076,699. For example, suitable sticking agents are polyhydric alcohols preferably having low volatility and including materials such as ethylene, propylene, dipropylene, triethylene, hexylene glycols; 2,2-diethyl-1,3-propanediol; 1,5-pentanediol; glycol ethers such as methyl or butyl Cellosolve; and low volatile ketones such as methylethyl ketone and diisobutyl ketone.

However, any suitable fertilizer may be employed as the carrier. For example, granular particles of urea-formaldehyde condensation product produced by a process in which the U-F is foamed during the condensation reaction, and simultaneously or subsequently combined with neburon may be used.

Weeds known to be pests in lawns which may be controlled with neburon include:

| | |
|---|---|
| Crabgrasses | Digitaria spp. |
| Annual bluegrass | Poa annua. |
| Mouse ear chickweed | Cerastium vulgatum. |
| Common chickweed | Stellaria media. |
| Soliva | Soliva sessilis. |
| Cudweed | Gnaphalium chilense. |
| Barnyard grass | Echinochloa crus galli. |
| Tall umbrella plant | Cyperus eragrostis. |
| Ryegrass | Lolium multiflora. |
| Red stem filares | Erodium cicutarium. |
| Baby tears | Helxine soleirolii. |
| Pearlwort | Sagina spp. |
| Annual plantago | Plantago spp. |
| White clover | Trifolium repens. |
| Oxalis | Oxalis corniculata. |

Effective crabgrass control was obtained when the first of two applications was applied prior to or after crabgrass germination and up to and including the early branching stage of growth. Annual bluegrass, common chickweed, mouse ear chickweed, *Soliva sessilia*, cudweed, and red stem filaree were controlled with a single application of a granular-neburon-fertilizer composition at a rate of 4 lbs. neburon/acre. Other weeds effectively controlled included barnyard grass, annual plantain, ryegrass, baby tears and pearlwort.

The safety of granular fertilizer containing neburon to established stands of Dichondra, Bermuda and bluegrass was found excellent. Rates four times the recommended amount for crabgrass control was not phytotoxic when applied in the fall, winter and spring. Rates double the amount recommended were not phytotoxic when applied in the summer.

The following examples illustrate the use of neburon for selective weed control in turf. Example I sets forth the best mode of carrying out the present invention.

*Example I*

A granular neburon-fertilizer composition was applied with a lawn spreader to give 4 lbs./acre neburon on a weed infested stand of Bermuda and Dichondra. The neburon gave excellent weed control while the fertilizer stimulated Dichondra and Bermuda growth. The preferred granular composition had the following formula:

| | Parts by weight | Preferred range, parts by weight |
|---|---|---|
| Neburon | 6 | 2-54 |
| Hexylene glycol | 13 | 8-20 |
| Methyl violet dye | 0.1 | 0.05-2 |
| 24-0-0 analysis fertilizer particles | 500 | 500 |

The above compositions were prepared as follows:

*Step 1: Preparation of fertilizer composition.*—A fertilizer containing about 24% nitrogen was made in the manner disclosed in copending application Serial No. 693,629, now Patent No. 3,076,700. Briefly, this involves preparing a methylol ureas solution containing urea and formaldehyde with approximately a 2:1 mol ratio adjusted to a pH value of 7-9.5. Vermiculite was then coated and impregnated with said solution while acidifying to a pH of 3.0-4.0, said mixing being carried out under conditions sufficient to cause the ingredients thereof to undergo a condensation reaction to form a partially insoluble resinous methylene ureas nitrogen-containing reaction product in situ about said particles. The mixture was buffered to a final pH range of approximately 4.5 to 6.5 whereby said fertilizer composition had at least ⅓ of the total nitrogen in water insoluble form with an availability index of at least 35%. The resultant fertilizer was dried and sized to give a granular product.

*Step 2: Incorporation of herbicide.*—The fertilizer made as in Step 1 was fed into a blender and blended with neburon and hexylene glycol (a sticking agent) in the manner taught by copending application Serial No. 60,287, now Patent No. 3,076,699. The resulting product containing 1.1% neburon was ready for use in selectively controlling weeds.

*Example II*

A granular neburon composition having the following ingredient amounts was applied with a lawn spreader to give 8 lbs./acre neburon on a stand of weed infested Dichondra.

| | Parts by weight | Preferred range, parts by weight |
|---|---|---|
| Neburon | 20 | 2-54 |
| Hexylene glycol | 21 | 10-64 |
| Oil red dye | 3 | 1-10 |
| Vermiculite | 500 | 500 |

Excellent weed control was obtained by use of this composition with no damage to the Dichondra.

The above composition was made by blending vermiculite, neburon and hexylene glycol in the manner taught by copending application Serial No. 60,287, now Patent No. 3,076, 699.

*Example III*

A granular neburon composition made as described in Example 2 above was spreader applied at a rate of 6 lbs. neburon/acre to a stand of Kentucky bluegrass infested with *Poa annua*. A second application at the same rate was made four months later. One month after the second application, 95% *Poa annua* control was seen while damage to the Kentucky bluegrass was negligible.

Table I below shows results obtained by the use of granular neburon and granular neburon-fertilizer compositions of Examples I and II for selective weed control. Neburon gave both pre-emergence and post emergence weed control and showed activity when applied at various times during the year.

TABLE I.—PERCENT WEED CONTROL USING GRANULAR NEBURON COMPOSITIONS

| Weed species | Granular Neburon composition, lbs. Neburon/acre | | Granular Neburon fertilizer composition, lbs. Neburon/acre | | |
|---|---|---|---|---|---|
| | 4 | 8 | 4 | ¹4 | 8 |
| Crabgrass, Test 1 | | 75 | | 95 | 75 |
| Crabgrass, Test 2 | | 95 | | 100 | 100 |
| Crabgrass, Test 3 | | 90 | | 100 | 95 |
| Crabgrass, Test 4 | | 90 | | 90 | |
| Poa Annua, Test 1 | | | 100 | | 90 |
| Poa Annua, Test 2 | | | | | 100 |
| Poa Annua, Test 3 | | | | | 100 |
| Barnyard grass | | | | | 100 |
| Common chickweed | 100 | | | | |
| Mouse ear chickweed | 100 | | | | |
| Tall umbrella plant | | | | 90 | 95 |
| Oxalis | | | | 100 | 90 |
| White Clover | | | | 100 | 90 |
| Soliva sessilis | | | 100 | | |
| Cudweed | 100 | | | | |
| Annual plantago | | | | | 100 |
| Pearlwort | | | | | 100 |
| Baby tears | | | | | 100 |
| Annual ryegrasses | | | | | 100 |
| Red stem filaree | | | | 100 | |

¹ Two applications 1-3 months apart of four pounds each were made.

The above examples are meant to be illustrative not restrictive. For example, while tests described in the examples were made with the preferred granular compositions, dusts and sprays were active at comparable rates.

Dichondra, Bermuda and Kentucky bluegrass were all found to be tolerant of herbicidal rates of neburon. Rates of up to 16 lbs./acre active neburon were found to be essentially nontoxic to these desirable species.

The invention may be embodied in other specific forms without departing from the spirit or essential characteristics thereof. The present embodiments are therefore to be considered in all respects to be illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. The method of selectively killing weeds in turf areas, which comprises the step of applying to the area to be treated a herbicidal amount of the trisubstituted urea 3 - (3,4 - dichlorophenyl) - 1 - methyl - 1 - n - butyl urea combined with a particulate fertilizer comprising a urea-formaldehyde condensation product.

2. A method of selective weed control as defined in claim 1, wherein plural applications of said trisubstituted urea-fertilizer combination are made to the same area, said applications being spaced by a period of days.

3. A method of selective weed control as defined in claim 1, wherein the trisubstituted urea-fertilizer composition is applied at a rate resulting in the application of 4–8 pounds of the trisubstituted urea per acre.

4. A composition of matter for selectively controlling weed growth in turf, comprising an herbicidally active amount of 3 - (3,4 - dichlorophenyl) - 1 - methyl - 1 - n - butyl urea combined with fertilizer particles of a urea-formaldehyde condensation product.

5. A herbicidal composition as defined in claim 4, together with a particulate vermiculite carrier, said fertilizer being formed in situ about the vermiculite particles; and a sticking agent for sticking the trisubstituted urea on the vermiculite particles.

References Cited by the Examiner

UNITED STATES PATENTS

| | | | |
|---|---|---|---|
| 2,655,444 | 10/1953 | Todd | 71—2.6 |
| 2,898,206 | 8/1959 | Monoogian et al. | 71—2.6 |
| 3,074,845 | 1/1963 | Geary. | |

FOREIGN PATENTS 1,197,139  6/1959  France.

OTHER REFERENCES

Crafts, The Chemistry and Mode of Action of Herbicides, Interscience Publishers, New York, 1961, pages 84 to 103 (pages 85 and 86 particularly relied on).

Schmidt et al., Northeastern Weed Control Conference, New York, 1960, pages 278 to 283.

Woodford, Weed Control Handbook, Blockwell Scientific Publications, Oxford (Second Ed., page 19), 1960.

LEWIS GOTTS, *Primary Examiner.*

JULIAN S. LEVITT, JAMES O. THOMAS,
*Assistant Examiners.*